E. BLISS.
Watch Case.
No. 628. Reissued Nov. 23, 1858.
Fig. 1,
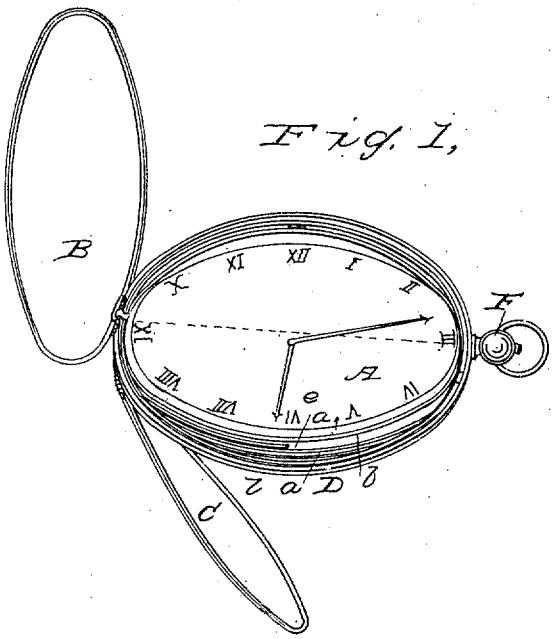
Fig. 2,
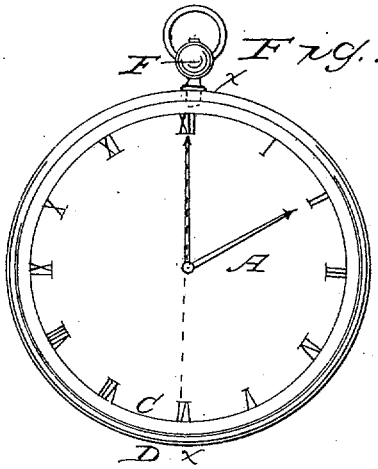
Fig. 3,
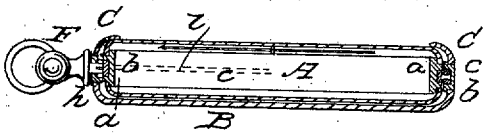
Fig. 4,
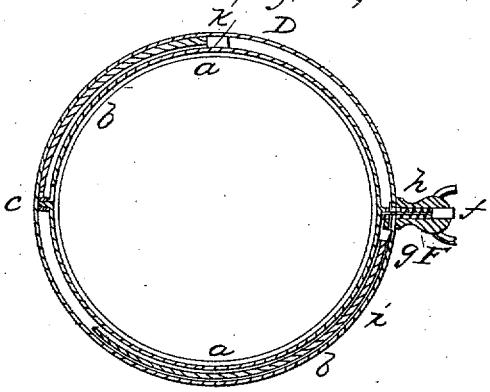
N. PETERS, Photo-Lithographer, Washington, D. C.

UNITED STATES PATENT OFFICE.

ELIHU BLISS, OF NEWARK, NEW JERSEY, ASSIGNOR TO WICKLIFFE E. BALDWIN AND E. BLISS.

IMPROVEMENT IN WATCH-CASES.

Specification forming part of Letters Patent No. 19,966, dated April 13, 1858; Reissue No. 628, dated November 23, 1858.

*To all whom it may concern:*

Be it known that I, ELIHU BLISS, of Newark, county of Essex, State of New Jersey, have invented certain new and useful Improvements in Watch-Cases; and I do hereby declare that the following is a full, clear, and exact description thereof, reference being had to the accompanying drawings, making part of this specification, in which—

Figure 1 is a perspective view of a watch-case embracing my improvements, and representing the dial facing the closed bezel. Fig. 2 is a plan of the same with the watch reversed in the outer case, the dial facing the open bezel. Fig. 3 is a section of the case, taken at the line X X of Fig. 2; and Fig. 4 is another section taken at the line B *b* of Fig. 3.

The same letters indicate like parts in all the figures.

My improvements relate to that class of watches in which the dial can be either visible to be used as an open-faced watch, or concealed to be used as a hunting-watch; and the first part of my invention consists in arranging the push-piece passing through the pendant so as to operate the spring-catch to the closed back of the outer case when the face of the watch is in either position; and the second part of my said invention relates to the method of shifting the body of the watch so that the figures on the dial may be placed in the right position relatively to the pendant whether the dial be placed to face the closed or the open bezel, and this part of my said invention consists in arranging the case which holds the movement and which carries the dial within a surrounding ring, so that it can be turned within the said ring and in the plane thereof, so as to shift the figure twelve to be in line with the pendant when the dial is presented to the open bezel, and shifted around quarter of the circle to place the figure three in line with the pendant, as required for a hunting-watch when the dial is presented to the closed bezel; and the third part of my invention relates to the method of attaching the inner case containing the movement or body of the watch to the outer case, (in double-case watches,) which consists in connecting the surrounding ring of the inner case with the journals on which the body of the watch turns when reversed to present the dial to either bezel of the outer case, so that the body of the watch is left free, that it may be shifted on its surrounding ring to bring the figures in the proper position when reversed.

The accompanying drawings represent the several parts of my invention as applied to a double-case watch, an interior one containing the works and carrying the dial being permanently connected with the exterior case in such manner that it can be turned therein to reverse the dial to make either an open-face or a hunting watch without taking the inner case out of the outer case, as in the well-known magic-case watches. The interior case consists of a ring formed in two parts, and provided with a closed metallic back and an open frame for holding the glass, or, as they are termed in the trade, open and closed bezels. The inner ring, *a*, is grooved on its outer circumference so as to leave a flange on each edge, and in this groove is fitted the outer ring, *b*, so that the body of the watch can be turned in the plane of the said groove in order to change the position of the figures in relation to the pendant when the watch is to be changed from an open-face to a hunting watch, or vice versa. A slot, *l*, is cut through the outer ring, extending a little more than one-quarter of the circle, or one edge of the ring is removed to the same extent, and a small screw or pin, *e*, is inserted through the slot into the inner ring, and this limits the range of motion of the body of the watch to one-quarter of the circle, so that it can be turned to place either of the figures three or twelve on the dial in line with the pendant. The outer ring of the inner case is provided with apendant, F, permanently attached to it, the shank of which passes through a socket in the outer case, as in ordinary magic-case watches, and is covered by a cap, *k*, to prevent it rising. The opposite side of the ring in the line of the pendant is also provided with a pivot or small journal, *c*, and both the shank of the pendant F and the pivot or small journal *c* are fitted to turn in suitable sockets in the ring of the outer case, and in this way the inner case can be readily turned in the outer case by means of that part of the pendant which projects in the usual manner outside of the outer case. Through the center of the pendant passes a push-piece, *f*, to operate a spring-catch, *i*, which holds the closed bezel of the outer case when shut, and a pin, *h*, passes through this push piece near the inner end, and projects through slots cut in the pendant on either side, and acts upon the spring *i* in both positions of the watch. To reverse the watch both bezels of the outer case must be open, and after turning the body of the watch within the outer case, which is done by the pendant, as already stated, the movement of the watch, with the dial, is then to be turned one-quarter of the circle within the surrounding ring, to bring the figures on the dial in the right position relatively to the pendant, whether for an open-face or a hunting watch, and then by closing either of the bezels the body of the watch is secured in place so that it cannot reverse.

I do not confine myself to the precise arrangement and connection with each other of the body of the case and the ring in which it turns, as they are susceptible of many modifications, and still admit of turning the body of the watch in the plane of the dial to shift the figures relatively to the pendant. The outer ring, instead of being slotted, may be grooved in the interior surface to receive and cover the head of the stop which limits the range of motion of the body of the watch. Recesses may be cut at both ends and at right angles to the slot or groove, to receive the stop and thus lock and prevent the body of the watch from turning back after being adjusted to the pendant. The bezel holding the glass may form one of the flanges for holding the outer to the inner ring, if thought best. Nor do I wish to be understood as limiting my claim of invention to the use in connection of the several parts of my said invention, as some of the parts claimed may be used in connection with other and equivalent modes.

What I claim as my invention, and desire to secure by Letters Patent, is—

1. Arranging the push-piece which passes through the pendant substantially as described, in combination with the pin *h*, and so as to operate the spring-catch to the closed bezel of the outer case when the face of the watch is in either position, as set forth.

2. Arranging the case of the watch which contains the movement, and which carries the dial, within a surrounding ring or rim so that it can be turned within the said ring and in the plane thereof, substantially as described, and for the purpose set forth.

3. Arranging the journals by which the body of the watch is attached to an outer case, and on which it turns when reversed, so as to leave the works of the watch free to be shifted in its surrounding ring, substantially as described.

ELIHU BLISS.

Witnesses:

F. SOUTHGATE SMITH,
JOHN S. HOLLINGSHEAD.